No. 723,281. PATENTED MAR. 24, 1903.
W. E. JAQUES.
MAKING CEMENTITIOUS PRODUCTS OR ARTIFICIAL STONE.
APPLICATION FILED NOV. 1, 1902.
NO MODEL.
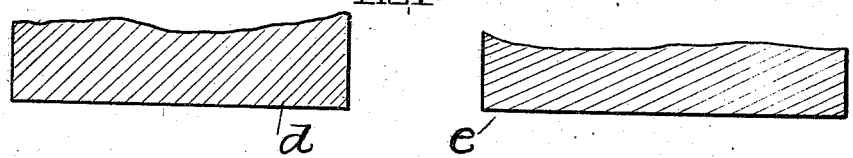
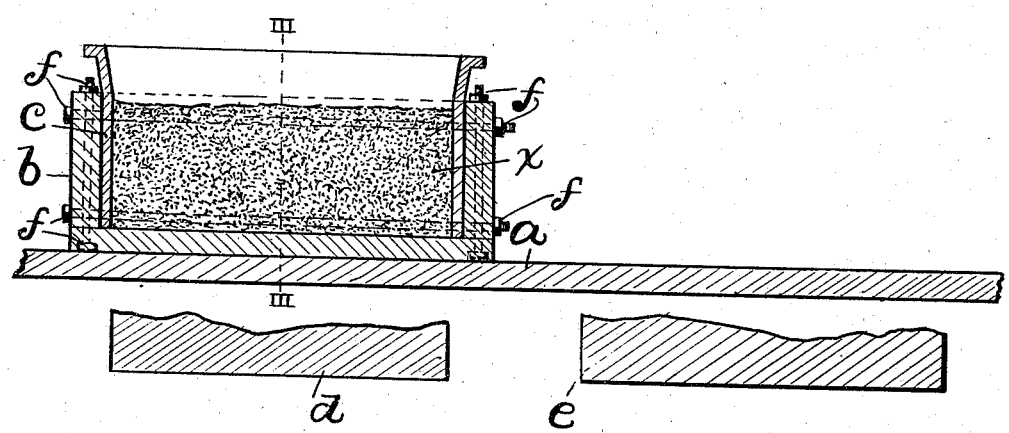
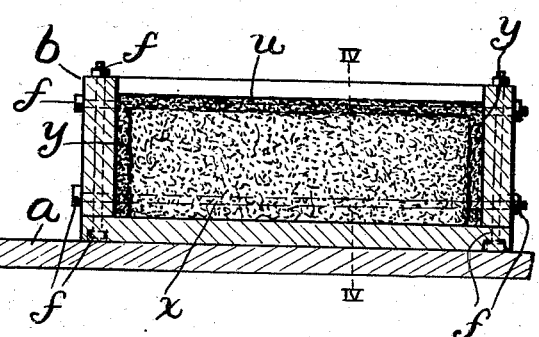
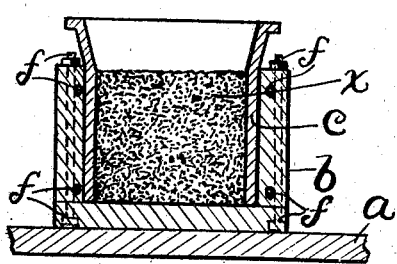
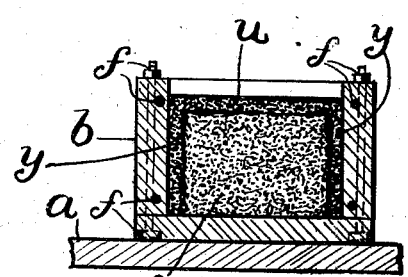
WITNESSES:
Daniel E. Daly.
Victor C. Lynch.
INVENTOR
William E. Jaques
BY
his ATTORNEYS

UNITED STATES PATENT OFFICE.

WILLIAM E. JAQUES, OF GRAND RAPIDS, MICHIGAN, ASSIGNOR TO ALFRED O. CROZIER, OF GRAND RAPIDS, MICHIGAN.

MAKING CEMENTITIOUS PRODUCTS OR ARTIFICIAL STONE.

SPECIFICATION forming part of Letters Patent No. 723,281, dated March 24, 1903.

Application filed November 1, 1902. Serial No. 129,758. (No specimens.)

*To all whom it may concern:*

Be it known that I, WILLIAM E. JAQUES, a citizen of the United States of America, residing at Grand Rapids, in the county of Kent and State of Michigan, have invented certain new and useful Improvements in Making Cementitious Products or Artificial Stone; and I hereby declare the following to be a full, clear, and exact description of the invention, such as will enable others skilled in the art to which it pertains to make and use the same.

This invention relates to improvements in making bricks or blocks or slabs or tiles or products in any form composed of cementitious material or artificial stone.

One object of this invention is to form in a mold a somewhat moist and unset and compacted but porous mass of cementitious material, not containing enough water or moisture nor enough cement or liquid cement or cementitious substance to enable an adequate setting of the compacted mass, and then to force the required additional amount of moisture and cement or cementitious matter, preferably in the form of cement in solution, into the pores of the said compacted mass by surrounding or facing the mass with the said solution or liquid cementitious composition within the mold, and then to exert further pressure upon the contents of the mold, so as to cause a spreading of the originally-compacted mass and result in the forcing or running into the said mass of liquid cement or cementitious liquid or liquid composition applied and confined next exteriorly of the said mass, and thereby supplying the said mass with the moisture and cement or cementitious matter required to render the resulting and finally-compacted mass suitable for a proper setting and hardening of the product.

Another object of this invention is to surround the originally-compacted mass not only with enough cementitious solution to fill the pores of the said mass, but to form a facing externally of the resulting product and to have more water or moisture in the facing-forming liquid composition than required for the formation of the said facing, so as to facilitate the passage of the excess of water or moisture in the said liquid composition into the originally-compacted porous mass.

Another object of this invention is to add any staining or coloring matter—such, for instance, as chemicals, paints, and varnish—to mix the same with and make the same a part of the facing-forming liquid, so that the resulting product will have an exterior facing or surface composed of material which differs in color, density, or degree of hardness, or in other ways from the originally-compacted mass, which forms the body portion or body of the resulting product.

In the accompanying drawings, Figures I and II are side elevations in section of apparatus suitable for use in making my improved cementitious product and in carrying out the process employed in making the said product. Fig. III is a vertical section on line III III, Fig. I. Fig. IV is a vertical section on line IV IV, Fig. II.

Referring to the drawings, $a$ designates a table or bed, and $b$ a mold-forming box or case, which rests removably upon the said bed or table and is open at the top.

The box or mold $a$ is provided interiorly, as shown in Figs. I and III, with a lining $c$, which covers, preferably, all of the interior upright walls of the box or mold $a$ and is removable upwardly from within the mold. A plunger $d$ is provided for compacting the cementitious material, which is fed or introduced, as will hereinafter appear, into the mold when the lining $c$ is in position within the mold, and another plunger $e$ is provided and enough larger in dimensions than the plunger $d$ to render it (the said larger plunger $e$) capable of snugly fitting the interior of the mold when the lining $c$ is removed from the mold, so as not only to exert pressure upon the mass of cementitious material already compacted within the mold during the presence of the said lining in the mold, but also to spread the originally-compacted mass, and thereby cause any liquid facing-forming cementitious material fed into the mold and surrounding the originally-compacted mass upon the removal of the aforesaid lining to be forced or run into the pores of the porous originally-compacted mass.

In making the originally-compacted mass within the mold while the lining $c$ is in position within the mold I preferably mix sand and hydraulic cement in the proportion, measured by weight, of about seven parts of sand to one part of liquid cement; but the water or moisture employed in making this liquid cement is preferably not sufficient to enable a proper setting of the resulting composition when the latter is fed or introduced into the mold having a lining placed therein, so that the mass $x$ (see Figs. I and III) thus fed into the mold is when compacted into the mold quite porous. This cementitious mass $x$ forms the body portion or body of the resulting product and is compacted within the mold while the lining $c$ is within the mold by introducing the plunger $d$ far enough into the mold or in any approved manner. The cementitious mass thus compacted within the mold while the lining $c$ is within the mold is upon being compacted as aforesaid compacted enough to render it self-sustaining, so far as disintegration or destruction thereof is concerned, so that the lining $c$ can then be removed from the mold without breaking or destroying the said compacted mass. The lining $c$ is then removed, whereupon the facing-forming liquid composition $y$, (see Figs. II and IV,) composed, preferably, of water and hydraulic cement and having paint, varnish, or other staining or coloring matter mixed therewith and forming a part thereof if the facing to be formed upon and externally of the resulting product is to differ in color from the color or appearance of the originally-compacted cementitious mass, is supplied to the space then surrounding the originally-compacted mass and vacated by the withdrawal of the lining $c$ from the mold, and thereupon further pressure is exerted upon the originally-compacted mass and added liquid facing in any approved manner—as, for instance, by the larger plunger $e$—upon the removal of the mold and contents to and in under the said plunger $e$ and introducing the said plunger $e$ far enough into the mold to exert further pressure upon the originally-compacted mass to cause a spreading of the said mass within the mold, and thereby result in the forming or running of the cementitious liquid or facing-forming liquid composition into the pores of the said mass, thereby supplying the porous originally-compacted cementitious mass with water or moisture still required to render the said mass capable of setting properly and also supplying the said mass with the additional cement or cementitious matter required and to form, if desired, an external facing upon the resulting product differing in color, density, or degree of hardness or other characteristic from the originally-compacted mass. I would here remark that the facing-forming liquid composition contains more water or moisture than actually required in the said liquid, so as to facilitate the penetration of the excess of water or moisture and cement or matter carried thereby into the originally-compacted cementitious mass. The faced and liquid-permeated and further-compressed originally-compacted mass is then permitted to set and harden. The removal of the resulting product from the mold is effected in any approved manner, and the mold-forming box may be composed of sections removably secured together by bolts and nuts, as at $f$, the withdrawal whereof facilitates the removal of the product from the mold. Preferably before the final compacting of the partially-compacted mass when the latter has been surrounded by facing-forming material a layer of cementitious liquid or facing-forming composition $u$ (see Figs. II and IV) is spread over or on top of the partially-compacted mass, which layer during the subsequent compacting of the mass is largely forced into the partially-compacted mass and also supplies additional moisture and cementitious substance to the partially-compacted mass.

What I claim is—

1. An improvement in making a cementitious product or artificial stone, consisting in forming a compact porous mass of moist and unset cementitious material; then covering an external surface of the said compacted mass with a cementitious liquid and confining the said liquid externally of the said surface; then exerting further pressure upon the aforesaid compacted mass to spread the latter and thereby force or run moisture from the said liquid facing into the pores of the aforesaid compacted mass, and then permitting the resulting product to set and harden.

2. An improvement in making a cementitious product or artificial stone, consisting in compacting a mass of cementitious material into a predetermined form; then applying and confining a liquid composition externally of the said compacted mass; then exerting further pressure upon the said mass and added liquid facing and thereby spreading the said compacted mass and causing liquid to permeate the compacted mass, and then permitting the further-compacted and liquid-permeated mass to set and harden.

3. An improvement in making a cementitious product, or artificial stone, consisting in compacting a mass of materials into a predetermined form; then applying to the exterior of the said compacted mass a liquid compound or composition carrying coloring-matter, and then exerting further pressure upon the said mass and added exterior liquid facing so as to cause a spreading of the originally-compacted mass and thereby forcing or running liquid or moisture from the said externally-applied liquid facing into pores of the originally-compacted mass.

4. An improvement in making a cementitious product or artificial stone, consisting in compacting a mass composed of a somewhat-moistened porous composition of sand and cement in the proportions, measured by weight, of about seven parts of sand to one part of cement and exerting enough pressure upon the mass during the compacting of the same into a predetermined form to render the compacted mass self-sustaining without destroying the porosity of the mass; then applying and confining a liquid composition next to and exteriorly of the compacted mass; then exerting further pressure upon the originally-compacted mass to spread the said mass and thereby force or run liquid or moisture from the said liquid composition into pores of the said mass, and then permitting the resulting product to set and harden.

5. An improvement in making a cementitious product or artificial stone, consisting in compacting the mass of compactible materials, then applying to the exterior of the said compacted mass a moist compound or composition carrying coloring-matter, and then exerting further pressure upon the said mass and added exterior facing so as to cause a spreading of the original compacted mass and thereby force or run liquid or moisture from the externally-applied moist facing into the originally-compacted mass.

6. An improvement in making a cementitious product or artificial stone, consisting in compacting a mass of cementitious material; then surrounding the said compacted mass by an externally-confined liquid compound or composition; then exerting further pressure upon the said mass and added matter, and then permitting the resulting product to set and harden.

7. An improvement in making a cementitious product or artificial stone, consisting in compacting the mass of compactible materials, then applying and confining a liquid composition externally of the said compacted mass, then exerting pressure upon the said mass and added facing and thereby spreading the said compacted mass and causing liquid to permeate the compacted mass, and permitting the resulting product to set and harden.

8. An improvement in making a cementitious product or artificial stone, consisting in compacting a mass of cementitious material; then covering the said mass with liquid matter; then exerting further pressure upon the said mass and added matter, and then permitting the resulting product to set and harden.

In testimony whereof I sign the foregoing specification, in the presence of two witnesses, this 23d day of October, 1902, at Cleveland, Ohio.

WILLIAM E. JAQUES.

Witnesses:
  C. H. DORER,
  TELSA SCHWARTZ.